United States Patent Office 2,851,892
Patented Sept. 16, 1958

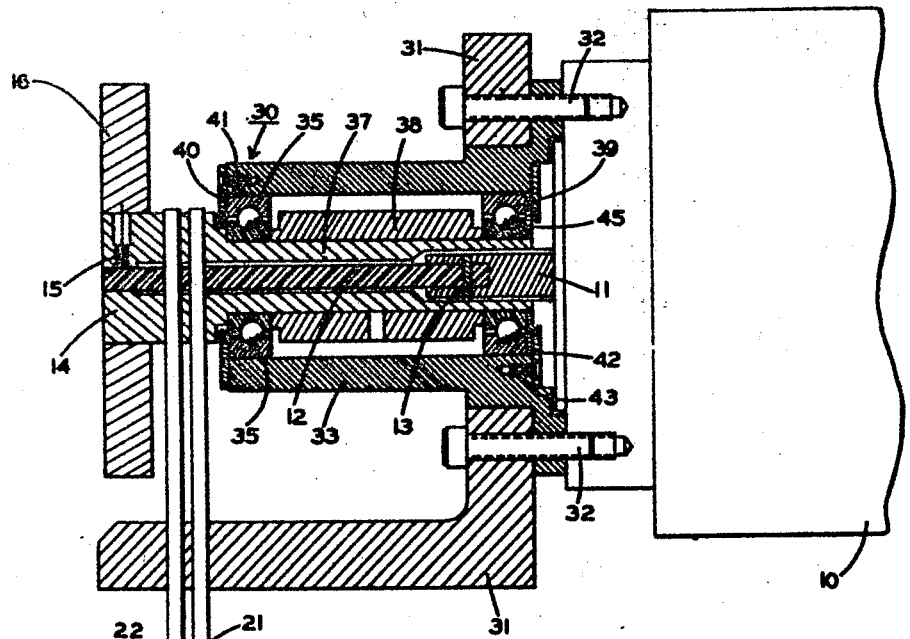
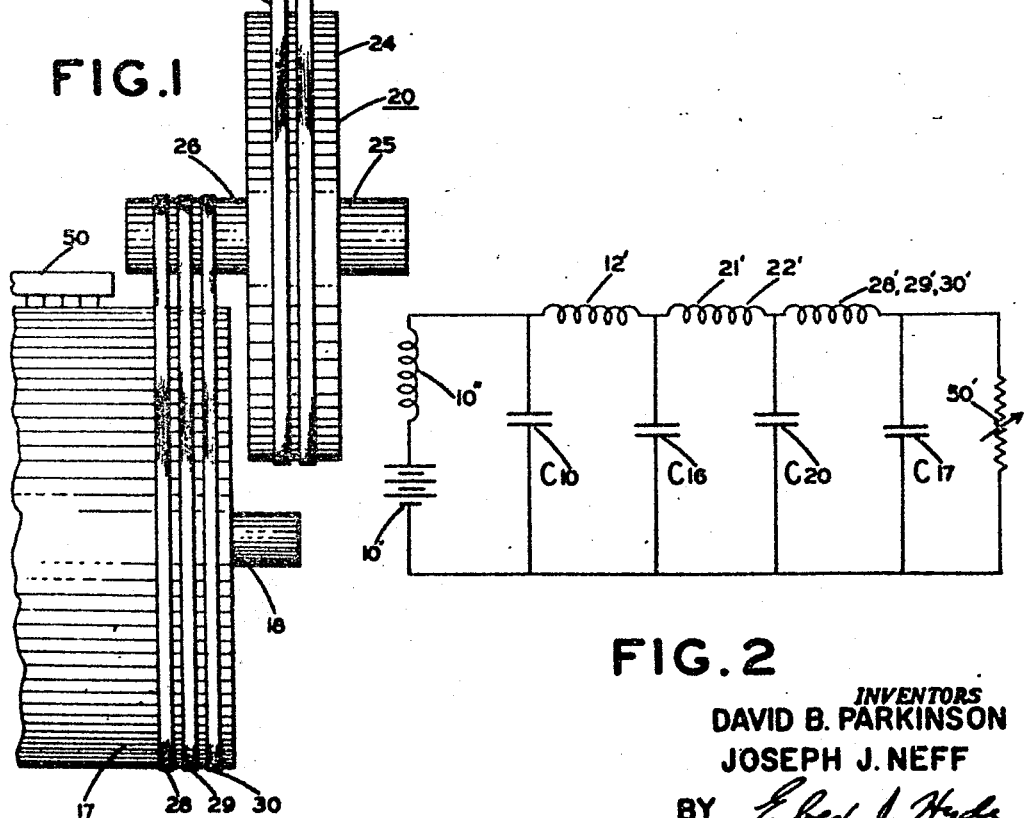
FIG.1
FIG.2
INVENTORS
DAVID B. PARKINSON
JOSEPH J. NEFF
BY *Eber J. Hyde*
ATTORNEY

2,851,892
CONSTANT SPEED DRIVE SYSTEM

David B. Parkinson and Joseph J. Neff, Cleveland Heights, Ohio, assignors to Clevite Corporation, Cleveland, Ohio, a corporation of Ohio Application October 1, 1956, Serial No. 613,007

8 Claims. (Cl. 74—219)

This invention pertains to a constant speed drive system and achieves its maximum utility in recording and reproducing systems utilizing frequency modulation in the recording-reproducing process.

An example of such a system is the seismic recorder shown and described in application Serial No. 605,912, filed August 6, 1956, for Seismic Prospecting Apparatus, in the names of Semi J. Begun and Alfred P. Dank.

While this drive system reaches its maximum utility in a frequency modulation system, it may be used in any device where uniform rotary motion is desired.

An object of the present invention is to provide a system wherein a motor drives a rotary device at a very fixed constant rate of rotation.

Another object of the present invention is to provide a constant speed rotary device whose instantaneous speed fluctuation is less than .05% of the nominal speed of the device.

For a better understanding of the present invention, together with other and further objects thereof, reference is had to the following description taken in connection with the accompanying drawings, and its scope will be pointed out in the appended claims.

An aspect of the present invention is the provision of a constant speed drive system which comprises a motor driving a compliant drive shaft. A flywheel is mounted on the compliant shaft and one or more metal belts such as steel, beryllium-copper, or other such non-compliant means very tightly couples the compliant shaft and the flywheel to the rotary device in order to drive the rotary device at a very constant rate of speed. The internal compliance of the motor plus the extra compliance of the shaft together with the mass of the flywheel and the rotary device forms a tuned system. Proper solution of the values of the components prevents undesirable fluctuation originating at the motor from reaching the rotary device.

Figure 1 of the drawings is a diagrammatic view partially in section showing the drive system of the invention.

Figure 2 is an equivalent circuit showing the electrical analogy of the system.

As is well known to all those who attempt to get uniform rotary motion from an electrical motor the drive shaft of the motor has considerable instantaneous speed variations which must be eliminated. In the past numerous flywheel systems have been tried and while these have partially solved the problem, experience has shown that the ordinary flywheel system does not eliminate enough of these instantaneous speed variations to permit its use for driving the drum of a magnetic recorder-reproducer device of the high grade instrument type, and especially it is not suitable where the magnetic recorder-reproducer system uses well known frequency modulation. When a production type motor is used to rotate a drum having recorded thereon a frequency modulated signal, reproduction of the signal will exhibit unwanted frequency modulation due to rapid variations of the motor speed. This is known as "noise" in an FM system.

In equipment of the type where the record is made on a rotating drum and then reproduced while on the same drum addition of the recording and reproducing noise is possible.

Prior experiments utilizing a flywheel between a motor and a drum, and utilizing gears to tightly couple the motor to the flywheel produced signal to noise ratios of less than 50 db. The present system utilizing a flywheel of the same mass as in the above experiment, but driven through a compliant shaft and coupled to the drum to be driven by very tight metal belts, consistently produces in excess of 60 db. signal to noise ratio.

With reference to the single sheet of drawing there is shown in Figure 1 an electric motor 10 having a short drive shaft 11. The motor drive shaft 11 is connected to a compliant drive shaft 12 by means of a pin 13, and at the outer end of the drive shaft 12 there is mounted a pulley 14 by means of a set screw 15. A massive flywheel 16 is secured to the pulley 14 and accordingly is driven at motor speed. Because the flywheel is driven at motor speed the mass of the flywheel may be reduced compared to those systems wherein the drum itself is supposed to serve as a flywheel. A rotary device 17 such as a drum upon which a belt of magnetizable material is to be mounted is supported in bearings 18. Magnet transducer heads 50 exert a variable frictional force on the rotating drum 17. The drum 17 may be driven by tight, non-compliant belts directly from the pulley 14 or indirectly through a speed reduction device 20 as is shown in the drawing. In either event the drum 17 must be very tightly coupled to the pulley 14. Metal belts 21, 22 are preferred and it is preferable to utilize a plurality of the metal belts in order to get very tight coupling. Gears are not satisfactory for coupling the pulley 14 to the drum 17 since even the finest of gears introduce speed variations in excess of that to be tolerated at the drum 17. Where a speed reduction device 20 is desired a large pulley 24 is mounted on a journaled shaft 25 and a smaller pulley 26 is connected to the larger pulley. The pulley 26 is connected by one or more metal belts 28, 29, 30 to the drum 17. Consequently even when drum 17 is driven through a speed reduction device 20 it is very tightly coupled back to the pulley 14 and flywheel 16.

The compliant shaft 12 may be formed of nylon or the like and it, together with the flywheel 16, filter out speed fluctuations originating in the motor 10. The extremely tight coupling between the flywheel 16 and the drum 17 established by the metal belts prevents any oscillations from originating at the drum or in the speed reduction device. Outside variations such as the variable contact of magnetic heads on the drum 17 tend to set up these speed variations. If the belts coupling the drum back to the pulley have any compliance or slippage, speed variations can be established and oscillations can be set up which tend to magnify themselves to very large amplitude.

In order to support the shaft 12 and to make the pulley 14 run concentric with respect to the shaft and the motor, a mounting device 30 is provided. A motor mount bracket 31 is secured to the motor housing by bolts 32. A bearing support housing 33 is secured by the same bolts 32 between the motor mount bracket 31 and the motor housing. The bearing support housing 33 extends outwardly in the general direction of the shaft 12 and carries bearings 35 at its outer end. The pulley 14 has an elongated stem 37 which extends inside the bearing support housing 33 and which terminates around the motor shaft 11. Mounted around this stem 37 is a bearing spacer 38 positioned between bearings 35 and the inner ball bearings 39. An end plate 40 is secured to the outer end of the bearing support housing 33 by means of screws 41 and an inner end plate 42 is similarly secured to the bearing support housing by means of screws 43. An axial loading spring 45 is mounted between the end plate 42 and the inner bearings 39 tending to take the end play out of the bearings.

By utilizing a compliant shaft 12 and the pulley mounting device 30 which has just been described, the motor 10 may be a sleeve bearing motor rather than a ball bearing motor. A sleeve bearing motor for an operation of this type is preferable because it has less inherent internal speed variations and because the sleeve bearing provides a certain amount of damping of the speed variations which do exist. In order further to dampen out speed fluctuations it has been found desirable in some installations to utilize a drive shaft 12 which has a certain amount of inherent internal damping. For this reason nylon and the like is preferable to steel or other such highly compliant non-damping materials.

For many installations the internal damping of the shaft 12 is not essential. Thus the motor 10 could have an unusually long drive shaft 11 which is machined down at one or more locations in order to provide the correct value of the compliance.

In the design of a constant speed system of this kind the engineer usually starts with the allowable speed tolerances on the drum 17. For example, in the aforementioned seismic equipment it was determined that instantaneous speed fluctuations were not to exceed .05% of the nominal value. It was calculated that if the drum itself were to act as a flywheel, it would have to weigh on the order of 3,000 pounds. Such a weight could not be tolerated. Consequently the drum 17 was tied back to the flywheel 16 by means of the very tight metal belts. Flywheel 16 which weighed only several pounds was rotated at motor speed, providing all of the flywheel effect necessary.

The mass of the flywheel 16 and the compliance of the shaft 12 were designed so that their resonant frequency did not come close to 30 cycles or any multiple or submultiple thereof. The mass of the flywheel 16 and the compliance of the shaft 12 and the internal compliance of the motor are so designed that they do not resonate near 30 cycles or any multiple or sub-multiple thereof, and the system is tuned so that virtually no speed fluctuations above 2 C. P. S. originating at the motor get through to the drum.

The compliance of the shaft 12 may be established by the type of material and its diameter. A metal shaft may be used necked down at one or more locations. A nylon shaft may be used and to increase its compliance, if necessary, certain localized areas may be necked down. The compliance of the belts 21, 22 in tension together with the effective mass of the speed reduction pulley 20 and the drum 17 is designed to have a resonant frequency dissimilar from the motor frequencies. To reduce the compliance between the flywheel and the drum 17 more belts may be added. This increases the stiffness and changes the natural frequency of the system.

Figure 2 of the drawings shows an electrical circuit analogy of the mechanical system just described. The velocity of the motor 10 is represented by the battery 10′. The internal compliance of the motor 10 is represented by the inductance 10″. The inertia of the motor 10 is represented by the capacitor $C_{10}$. The compliance of the drive shaft 12 is represented by the inductance 12′. The inertia of the flywheel 16 is represented by the large capacitor $C_{16}$. The compliance of the first belt system 21, 22 is represented by the inductance 21′, 22′. This is very small compared to inductance 12′. The inertia of the speed reduction device 20 is represented by capacitor $C_{20}$ and is very small compared to capacitor $C_{16}$ and is also small compared to capacitor $C_{16}$. The compliance of the belt system 28, 29, 30 is represented by the inductance 28′, 29′, 30′. Its value is small compared with the inductance of the shaft 12. The mass of the drum 17 is represented by the capacitor $C_{17}$. While the drum itself may be large in order to support a magnetic record medium, it is driven at a very low rate of rotation. Consequently, its inertia or flywheel effect (capacitance) is very small compared to the inertia or flywheel 16 which is very small but which is driven at a very high rate of rotation. The variable resistor 50′ represents the varying load of the magnetic heads 50 in contact with the magnetic material on drum 17 and represents other variable resistances such as the bearings on which drum 17 is mounted. Variations in the resistor 50′ are readily apparent across the capacitor 16 since inductances 28′, 29′, 30′ and inductances 21′, 22′ are very small. In other words, the flywheel 16 prevents the variable resistance of the heads 50 on drum 17 from being apparent. Variations in the output of the battery 10′ are filtered out by the large capacitors $C_{10}$ and $C_{16}$ and by the inductances 10″ and 12′. Consequently, fluctuations which tend to originate at either end of the circuit are damped out before they reach a magnitude which is objectionable.

While there have been described what are at present considered to be the preferred embodiments of the invention, it will be obvious to those skilled in the art that various changes and modifications may be made therein without departing from the invention and it is, therefore, aimed to cover all such modifications and changes as fall within the true spirit and scope of the invention.

What is claimed is:

1. A constant speed drive system comprising, a motor, a compliant drive shaft driven by said motor, a flywheel mounted on said compliant drive shaft, a rotary device to be driven at a constant speed, and metal belt means tightly operatively connecting said compliant shaft to said rotary device for driving said rotary device, the compliance of said motor and drive shaft and the effective mass of said flywheel and rotary device establishing a tuned system to substantially prevent speed fluctuations originating at said motor from reaching said rotary device.

2. A constant speed drive system as set forth in claim 1 especially for a magnetic recorder reproducer device, further characterized by the compliance of said motor and said drive shaft and the mass of said flywheel and drum establishing a tuned system whereby virtually no speed fluctuations above 2 C. P. S. originating at the motor get through to the drum.

3. A constant speed drive system as set forth in claim 2, further characterized by said drive shaft being formed of nylon having an internal damping effect.

4. A constant speed drive system comprising, a motor, a compliant drive shaft driven at one end by said motor, a flywheel mounted on the other end of said compliant shaft, a rotary device to be driven at a constant speed, speed reduction means, metal belt means tightly operatively connecting said compliant shaft to said speed reduction means and metal belt means tightly connecting said speed reduction means to said rotary device to be driven at a constant speed.

5. A constant speed drive system as set forth in claim 4 especially for a magnetic recorder reproducer device, further characterized by the compliance of said motor and drive shaft and the effective mass of said tightly coupled flywheel speed reducing means and rotary device establishing a tuned system to substantially prevent speed fluctuations originating at said motor from reaching said rotary device.

6. A constant speed drive device as set forth in claim 5, further characterized by the compliance of said metal belt means connecting said speed reduction means to said flywheel and the mass of said speed reduction means establishing a tuned system whose resonant frequency is sufficiently different from any fundamental speed fluctuation of said motor and its harmonics and sub-harmonics as not to excite said fluctuations.

7. A constant speed drive device as set forth in claim 6, further characterized by the compliance of said metal belt means connecting said speed reduction means to said rotary device and the mass of said rotary device establishing a tuned system whose resonant frequency is sufficiently different from any fundamental speed fluctuation of said motor and its harmonics and sub-harmonics as not to excite said fluctuations.

8. A constant speed drive system comprising, a motor, a compliant damped drive shaft one end of which is connected to said motor; a pulley connected to the other end of said drive shaft; a flywheel mounted on said pulley to be driven at motor speed; speed reduction means, metal belts tightly coupling said pulley to said speed reduction means; means to be rotated at a substantially constant rate of speed; and metal belts tightly coupling said speed reduction means to said means to be rotated.

References Cited in the file of this patent
UNITED STATES PATENTS

| | | |
|---|---|---|
| 242,256 | Boothroyd | May 31, 1881 |
| 1,309,245 | Coryell | July 8, 1919 |
| 1,913,886 | Kennedy | June 13, 1933 |
| 2,734,359 | Mulheim | Feb. 14, 1956 |

FOREIGN PATENTS

| | | |
|---|---|---|
| 797,567 | France | Feb. 17, 1936 |
| 898,116 | France | June 26, 1944 |